United States Patent
Boehme et al.

(10) Patent No.: US 9,522,479 B2
(45) Date of Patent: Dec. 20, 2016

(54) DEPTH INDICATOR FOR CIRCULAR SAW

(71) Applicant: Milwaukee Electric Tool Corporation, Brookfield, WI (US)

(72) Inventors: Chris Boehme, Pewaukee, WI (US); Jeffrey S. Holly, West Bend, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 97 days.

(21) Appl. No.: 14/296,961

(22) Filed: Jun. 5, 2014

(65) Prior Publication Data
US 2014/0360028 A1 Dec. 11, 2014

Related U.S. Application Data

(60) Provisional application No. 61/831,422, filed on Jun. 5, 2013.

(51) Int. Cl.
*B27B 9/02* (2006.01)
*B23D 45/02* (2006.01)
*B23D 59/00* (2006.01)
*B23D 45/16* (2006.01)

(52) U.S. Cl.
CPC .............. *B27B 9/02* (2013.01); *B23D 59/002* (2013.01); *B23D 45/16* (2013.01)

(58) Field of Classification Search
CPC .......... B27B 9/02; B23D 59/002; B27G 19/04

USPC ............................................ 30/505, 375–377
See application file for complete search history.

(56) References Cited

U.S. PATENT DOCUMENTS

| | | | | |
|---|---|---|---|---|
| 5,293,801 A | * | 3/1994 | Dritenbas | B27B 27/06 83/468.3 |
| 5,570,511 A | * | 11/1996 | Reich | B27B 9/02 30/376 |
| 7,223,163 B2 | * | 5/2007 | Neumeier | B23Q 11/06 451/451 |
| 2005/0000338 A1 | * | 1/2005 | Wascow | B27B 9/02 83/473 |
| 2005/0155231 A1 | * | 7/2005 | Hartmann | B27B 9/02 30/377 |
| 2009/0126206 A1 | * | 5/2009 | Chung | B27B 9/02 30/376 |
| 2011/0162218 A1 | * | 7/2011 | Roise | B27B 9/02 30/377 |
| 2011/0203121 A1 | * | 8/2011 | Hartmann | B23D 59/002 30/377 |

* cited by examiner

*Primary Examiner* — Laura M Lee
(74) *Attorney, Agent, or Firm* — Michael Best & Friedrich LLP

(57) ABSTRACT

A circular saw includes a saw blade, a housing at least partially surrounding the saw blade, and a base assembly pivotably supporting the housing for adjusting a depth of cut of the saw blade. A scale is coupled to one of the housing and the base assembly for indicating the depth of cut. A marker is coupled to the other of the housing and the base assembly to provide a reference for the scale.

11 Claims, 4 Drawing Sheets

DEPTH INDICATOR FOR CIRCULAR SAW

CROSS-REFERENCE TO RELATED APPLICATIONS

This application claims priority to U.S. Provisional Patent Application No. 61/831,422 filed on Jun. 5, 2013, the entire contents of which are incorporated herein by reference.

FIELD OF THE INVENTION

The present invention relates to power tools, and more particularly to circular saws.

BACKGROUND OF THE INVENTION

Circular saws are used for cutting workpieces made of a variety of materials such as, for example, metal, fiber and wood. Typically, circular saws are adjustable to adjust the depth or angle at which the workpieces are cut.

SUMMARY OF THE INVENTION

The invention provides, in one aspect, a circular saw including a saw blade, a housing at least partially surrounding the saw blade, and a base assembly pivotably supporting the housing for adjusting a depth of cut of the saw blade. A scale is coupled to one of the housing and the base assembly for indicating the depth of cut. A marker is coupled to the other of the housing and the base assembly to provide a reference for the scale.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
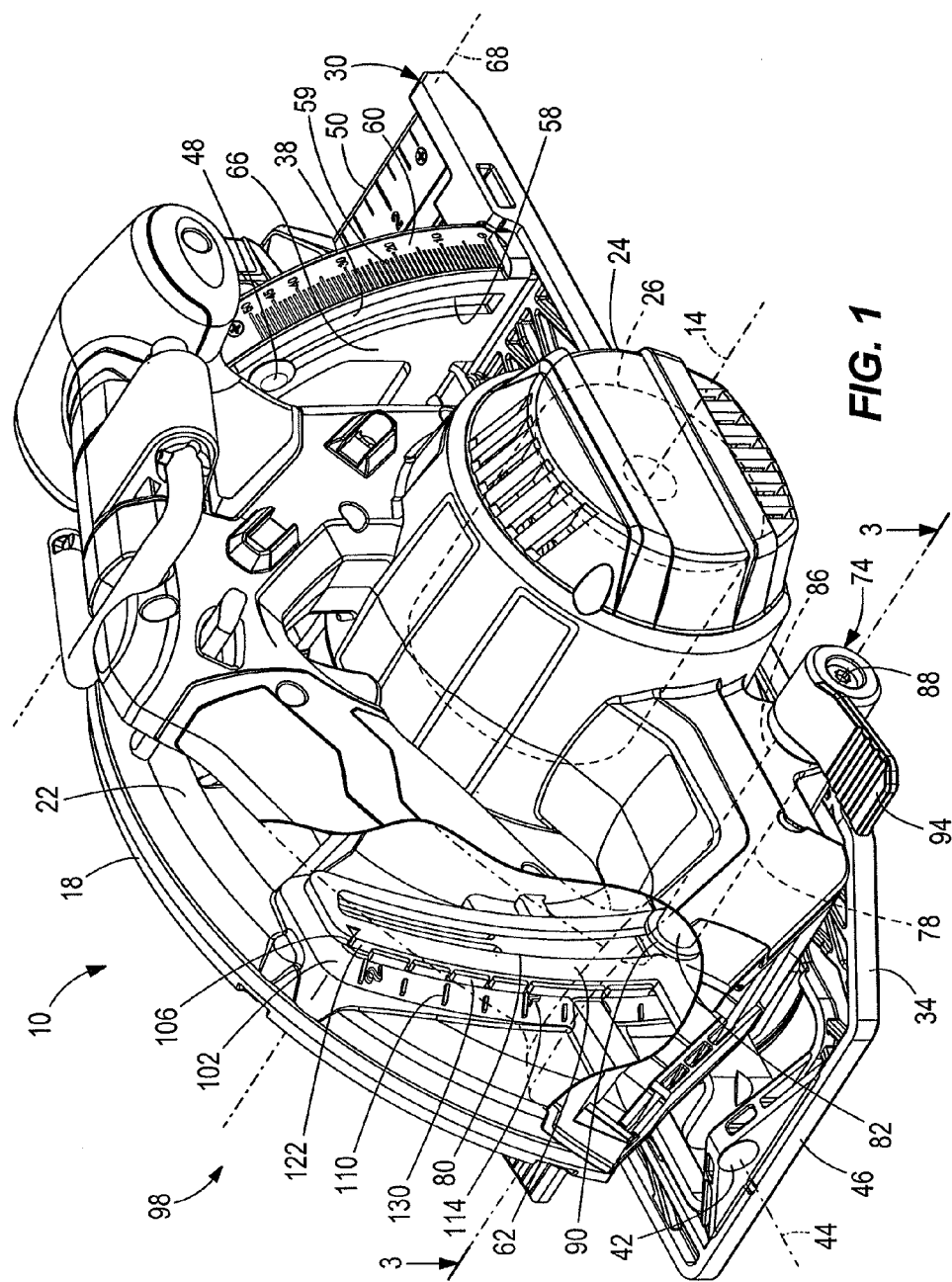
FIG. 1 is a perspective view of a circular saw in accordance with an embodiment of the invention.
Figure 2:
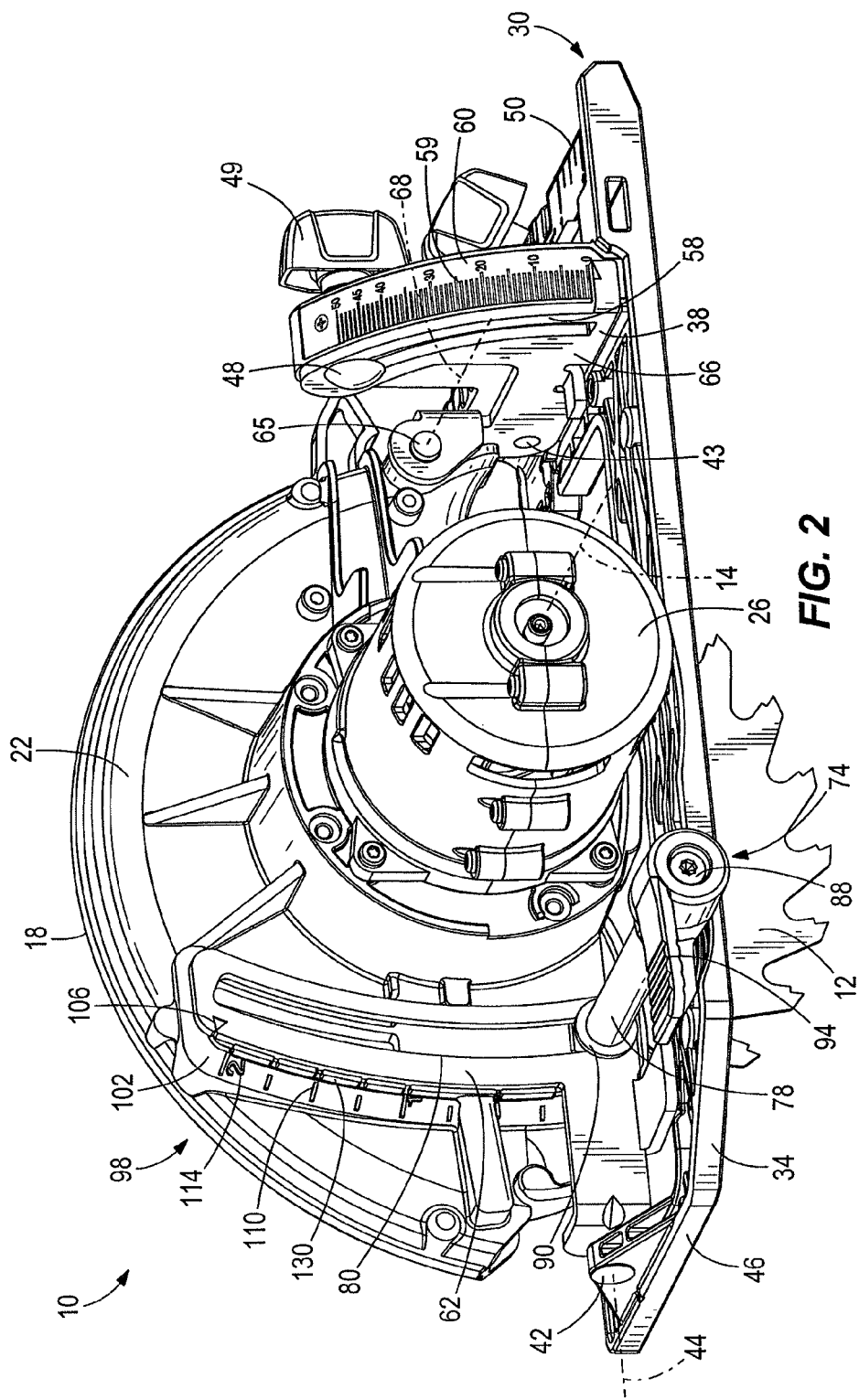
FIG. 2 is a perspective view of the circular saw of FIG. 1 with portions removed for clarity.

FIGS. 1 and 2 illustrates a circular saw 10 including a saw blade 12 supported for rotation about a rotational axis 14 and oriented in a plane that is substantially perpendicular to the axis 14. The saw blade 12 may be configured in any of a number of different ways for cutting any of a number of different types of materials (e.g., metal, wood, fiber, etc.), and may be interchangeable with other similar or dissimilar blades to suit a particular cutting operation.

The circular saw 10 includes a housing 18 having an upper blade guard portion 22, which surrounds an upper portion of the saw blade 12 to prevent access to the upper portion of the saw blade 12 and to contain chips, dust, or other debris. The housing 18 also includes a motor housing portion 24 enclosing a motor 26 of the circular saw 10. The motor 26 may be a brushless DC motor powered by a DC power source, such as a battery. Alternatively, the motor 26 may be an AC motor powered by a remote AC power source (e.g., a wall outlet) using a power cord.

With continued reference to FIG. 1, the circular saw 10 also includes a base assembly 30 pivotably coupled to the housing 18 for supporting the circular saw 10 on a workpiece (not shown). The housing 18 is adjustable relative to the base assembly 30 for adjusting both a bevel angle of the saw blade and a cutting depth of the saw blade. The base assembly 30 includes a shoe plate 34 and a bevel angle adjustment bracket 38 pivotably coupled to the shoe plate 34 by a pivot joint 42 on a rear end 46 of the shoe plate 34. The bevel angle is defined between the saw blade and the shoe plate 34.

With reference to FIG. 2, some housing components have been removed for clarity to illustrate a similar pivot joint 43 on a front end 50 of the shoe plate 34 that is aligned with the rear pivot joint 42 to thereby define a bevel angle adjustment axis 44 that is substantially perpendicular to the rotational axis 14 of the saw blade. In other words, the housing 18 and bracket 38 pivot relative to the shoe plate 34 about the bevel angle adjustment axis 44. The extent to which the bracket 38 is pivotable relative to the shoe plate 34 is defined by an arcuate slot 58 in the bracket 38. The circular saw 10 also includes a bevel locking member 48 (e.g., a bolt) extending through the slot 58 for selectively locking the bracket 38 to the shoe plate 34 and affixing the saw blade in a desired bevel angle relative to the shoe plate 34. The bracket 38 is affixed to the shoe plate 34 by tightening the bevel locking member 48 with a knob 49, clamping the bracket 38 and the shoe plate 34 together. The bevel angle adjustment bracket 38 includes spaced markings 59 and indicia 60 corresponding to the bevel angle of the saw blade.

The bevel angle adjustment bracket 38 also includes a guide bracket 62 positioned adjacent the upper blade guard portion 22 of the housing 18. In the illustrated embodiment of the circular saw 10, the guide bracket 62 is integrally formed with the bevel angle adjustment bracket 38 as a single piece. Alternatively, the guide bracket 62 may be formed separately from the bevel angle adjustment bracket 38 and attached thereto using any of a number of different fasteners or bonding processes (e.g., by welding, soldering, using adhesives, etc.). With reference to FIG. 2, the circular saw 10 includes a pivot joint 65 located on a front end 66 of the bracket 38 pivotably coupling the bevel angle adjustment bracket 38 with the housing 18 about a cutting depth adjustment axis 68, which is oriented substantially parallel with the rotational axis 14 of the saw blade 12. Accordingly, to adjust the cutting depth of the saw blade 12, the housing 18 is pivoted about the cutting depth adjustment axis 68, causing the upper blade guard portion 22 of the housing 18 to slide relative to and along the guide bracket 62.

Figure 3:
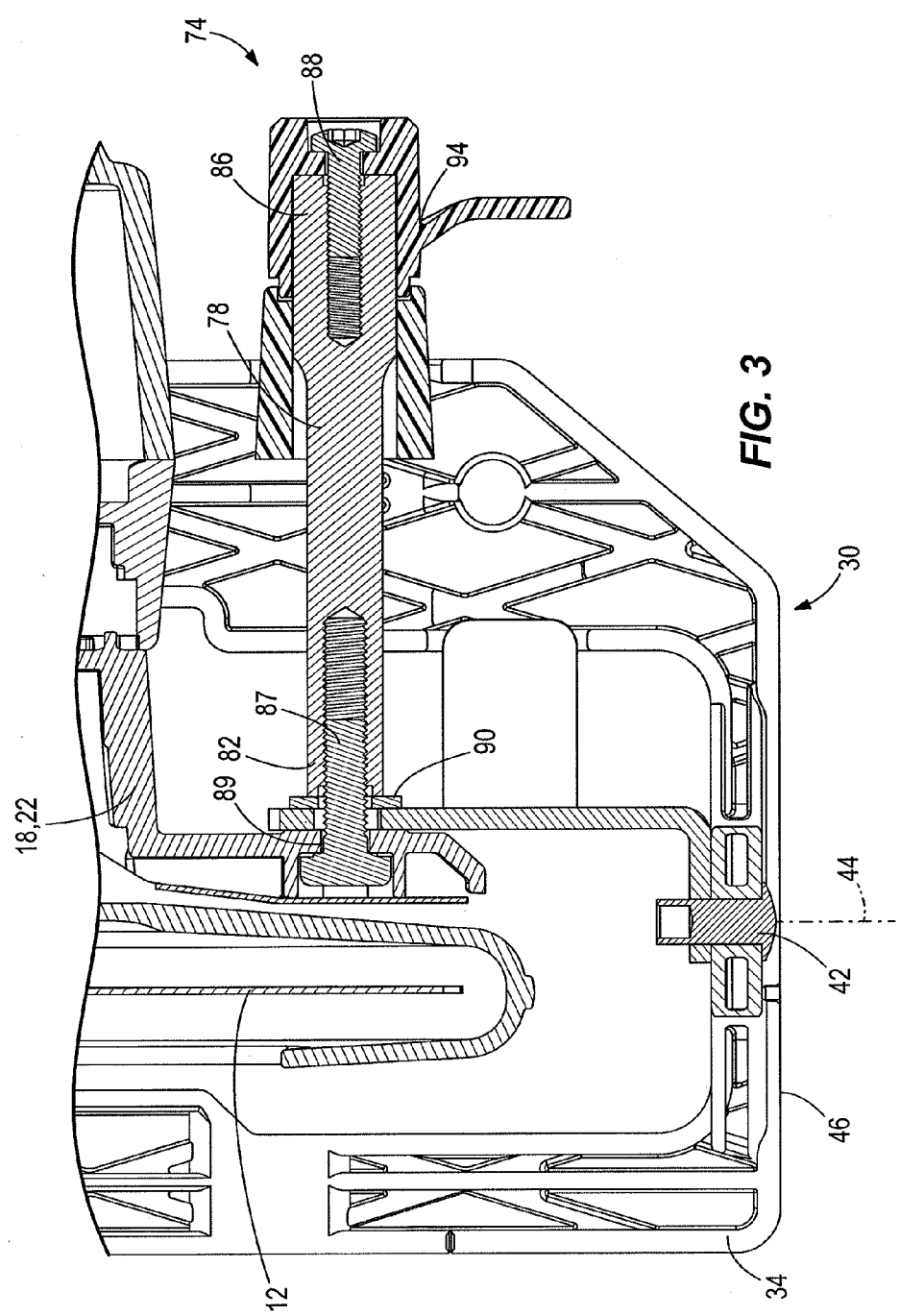
FIG. 3 is a cross-sectional view taken along the line 3-3 of FIG. 1.
Figure 4:
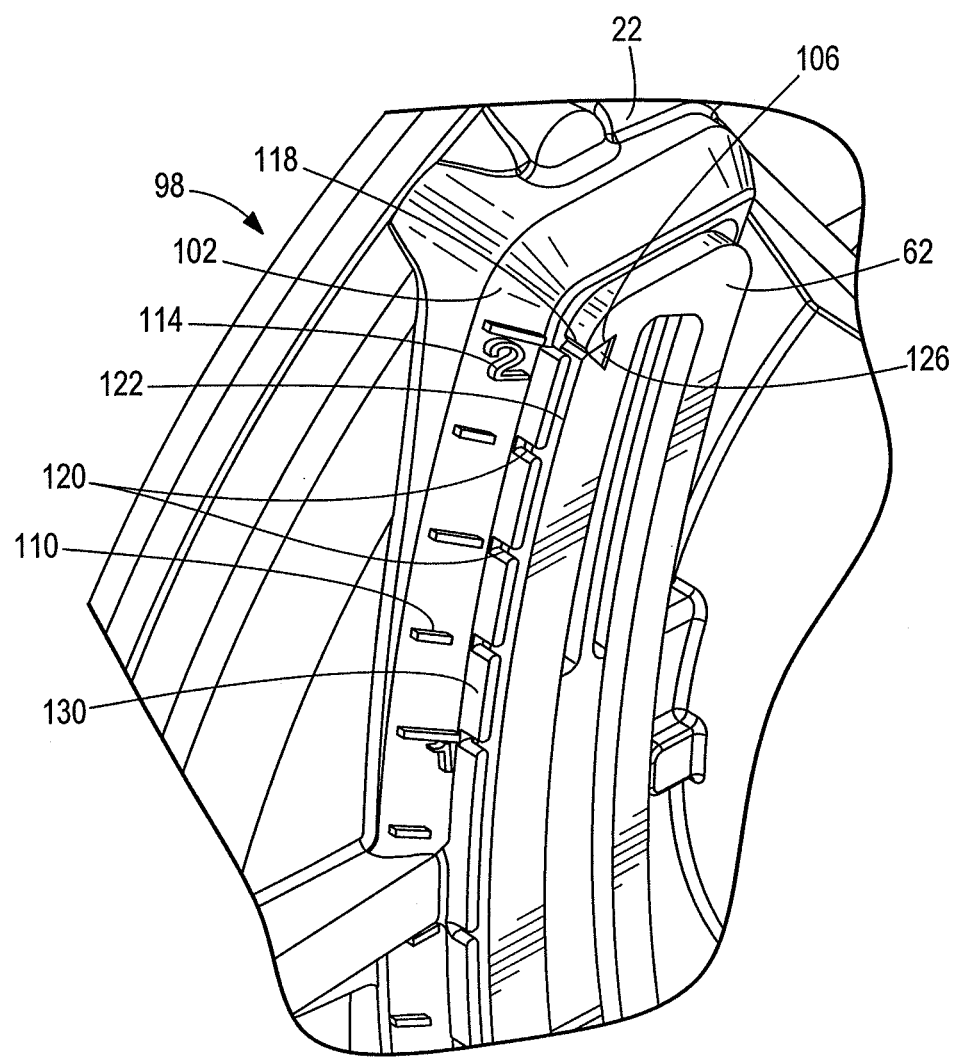
FIG. 4 is an enlarged perspective view of a depth indicator of the circular saw of FIG. 1.

With reference to FIGS. 1 and 3, the circular saw 10 includes a cutting depth lock 74 for securing the housing 18 at a desired cut depth relative to the base assembly 30. The cutting depth lock 74 includes a rod 78 having a first end 82 and a second end 86. The cutting depth lock 74 also includes a fastener (e.g., a bolt 87) inserted into a through bore 89 of the upper blade guard portion 22 and threaded to the first end 82 of the rod 78. The bolt 87 is received within an arcuate slot 80 formed in the guide bracket 62, and the extent to which the housing 18 is pivotable relative to the shoe plate 34 (i.e., to adjust the cutting depth) is determined by the length of the arcuate slot 80 in the bracket 62. The cutting depth lock 74 further includes a washer 90 positioned between the first end 82 of the rod 78 and the guide bracket 62, and a lever 94 that is axially retained by a fastener 88 to the second end 86 of the rod 78. The lever 94 includes a non-circular bore in which a corresponding non-circular exterior of the second end 86 is received to thereby affix the lever 94 to the rod 78 for co-rotation. In operation of the cutting depth lock 74, a user rotates the lever 94, causing the rod 78 to also rotate. Because the bolt 87 is affixed within the housing 18 and threaded to the rod end 82, relative rotation between the rod 78 and the bolt 87 causes the rod 78 to move toward the guide bracket 62 (for a clockwise rotation of the lever 94 and rod 78) to clamp the upper blade guard portion 22 and the guide bracket 62 between the washer 90 and the bolt 87. The bevel angle adjustment and the cutting depth adjustment are independently adjustable such that any combination of cutting depths and bevel angles is achievable The circular saw 10 also includes a depth indicator 98 for visually communicating to the user of the saw 10 the cutting depth of the saw blade. In the illustrated embodiment of the circular saw 10, the depth indicator 98 includes a scale 102 on the upper blade guard portion 22 of the housing 18 and a marker 106 on the guide bracket 62 (FIG. 4). The scale 102 includes a plurality of spaced markings 110 and indicia 114 corresponding to the cutting depth of the saw blade. In the illustrated embodiment, the scale 102 is integrally formed with the upper blade guard portion 22 of the housing 18, such that the markings 110 and indicia 114 are raised for contrast with the remainder of the housing 18. Alternatively, the scale 102 may be printed on an adhesive-backed label which, in turn, may be affixed to the upper blade guard portion 22 of the housing 18. Also, in the illustrated embodiment of the circular saw 10, the markings 110 are spaced at quarter-inch intervals and the scale 102 includes a two-inch range to accommodate a total adjustment in cutting depth of the saw blade of zero to two inches. Alternatively, the scale 102 may include a different range. In the illustrated embodiment, the cutting depth lock 74 and the depth indicator 98 are located proximate the rear end 46 of the base assembly 30.

With reference to FIG. 4, the marker 106 is partially defined by a notch 118 formed within a side edge 122 of the guide bracket 62, and further includes an arrow 126 to provide a visual queue to the user of the circular saw 10 that the marker 106 should be viewed as a reference point when adjusting the cutting depth of the saw blade. The marker 106 is inlaid with a color (e.g., red in the illustrated embodiment) for enhancing the contrast between the marker 106 and the guide bracket 62. The marker 106 selectively aligns with the markings 110 of the scale 102 to indicate the cutting depth of the saw blade relative to the base assembly 30. The marker 106, and in particular the notch 118, is visible to inform an operator of the cutting depth of the circular saw 10 when viewed from the rear end 46 of the base assembly 30.

As shown in FIG. 4, an arcuate lip 130 extends from the upper blade guard portion 22 and slidably engages the side edge 122 of the guide bracket 62. A plurality of notches 120 are defined in the lip 130 that coincide with the scale markings 110. The lip 130 shrouds the notch 118 of the marker 106 in all positions along the scale 102 with the exception of the positions coinciding with the markings 110.

Alternatively, the scale 102 may be included on the guide bracket 62 and the marker 106 may be included on the upper blade guard portion 22.

In operation, the lever 94 of the cutting depth lock 74 is rotated in a first (i.e., counterclockwise) direction, thereby rotating the rod 78 to loosen the clamping force applied to the guide bracket 62. Thereafter, the upper housing portion 22 and the guide bracket 62 are free to slide relative to one another to adjust the cutting depth of the blade. Once the cutting depth is appropriately selected by aligning the marker 106 with the desired depth indicia 114 or markings 110, the lever 94 of the cutting depth lock 74 is rotated in a second (i.e., clockwise) direction, opposite the first direction, thereby rotating the rod 78 with respect to the bolt 87. Rotation of the rod 78 relative to the bolt 87 further threads the rod 78 onto the bolt 87, clamping the guide bracket 62 and the upper housing portion 22 between the washer 90 and the bolt 87 to lock the guide bracket 62 and the upper housing portion 22 in a desired orientation relative to one another to provide a desired cutting depth of the saw blade.

Although the invention has been described in detail with reference to certain preferred embodiments, variations and modifications exist within the scope and spirit of one or more independent aspects of the invention as described. Various features and advantages of the invention are set forth in the following claims.

What is claimed is:

1. A circular saw comprising:
    a saw blade;
    a housing at least partially surrounding the saw blade;
    a base assembly pivotably supporting the housing for adjusting a depth of cut of the saw blade;
    a scale coupled to the housing for indicating the depth of cut; and
    a marker coupled to the base assembly to provide a reference for the scale;
    wherein the saw blade is rotatable about a first axis, and wherein the housing is pivotable relative to the base assembly about a second axis that is parallel with the first axis;
    wherein the base assembly includes a guide bracket having therein an arcuate slot, and wherein the circular saw further includes a lock that is at least partially disposed within the slot for selectively securing the housing relative to the base assembly;
    wherein the scale includes spaced markings and indicia corresponding to the depth of cut of the saw blade;
    wherein the housing includes an arcuate lip adjacent a side edge of the guide bracket, and wherein the arcuate lip includes a plurality of notches corresponding with the spaced markings of the scale; and
    wherein the marker includes a notch on the side edge of the guide bracket that is visible through one of the plurality of notches in the arcuate lip.

2. The circular saw of claim 1, wherein the lock includes a rod that is rotatable relative to the housing for selectively applying a clamping force to the guide bracket.

3. The circular saw of claim 1, wherein the base assembly includes a shoe plate and a bevel angle adjustment bracket pivotably coupled to the shoe plate about a third axis that is substantially transverse to the first and second axes.

4. The circular saw of claim 3, wherein the bevel angle adjustment bracket includes spaced markings and indicia corresponding to a bevel angle of the saw blade.

5. The circular saw of claim 3, wherein the housing is pivotably coupled to the bevel angle adjustment bracket about the second axis.

6. The circular saw of claim 5, wherein the bevel angle adjustment bracket includes an arcuate bevel adjustment slot, and wherein the circular saw further includes a bevel lock that is at least partially disposed within the arcuate bevel adjustment slot for selectively securing the housing relative to the base assembly.

7. The circular saw of claim 6, wherein the bevel lock and the lock within the guide bracket are independently adjustable such that any combination of cutting depths and bevel angles is achievable.

8. The circular saw of claim 3, wherein the guide bracket is coupled to the bevel angle adjustment bracket.

9. The circular saw of claim 8, wherein the guide bracket is interconnected with the bevel angle adjustment bracket through the housing.

10. The circular saw of claim 1, wherein the scale is integrally formed with the housing and the marker is integrally formed on the guide bracket.

11. The circular saw of claim 1, wherein the marker is inlaid with a color to enhance a contrast between the marker and the guide bracket.

\* \* \* \* \*